United States Patent [19]

Kugelman

[11] Patent Number: 4,706,160
[45] Date of Patent: Nov. 10, 1987

[54] NOISE TOLERANT FAST ACTING OPTICAL OVERCURRENT PROTECTOR AND METHOD

[75] Inventor: Michael M. Kugelman, Akron, Ohio

[73] Assignee: The B.F. Goodrich Company, Akron, Ohio

[21] Appl. No.: 851,852

[22] Filed: Apr. 14, 1986

[51] Int. Cl.$^4$ .............................................. H02H 3/08
[52] U.S. Cl. ................................... 361/100; 361/101; 323/277
[58] Field of Search ..................................... 361/54–57, 361/100, 101, 93; 323/223, 277, 902

[56] References Cited

U.S. PATENT DOCUMENTS

| | | | |
|---|---|---|---|
| 3,303,388 | 2/1967 | Means | 317/33 |
| 3,603,843 | 9/1971 | Clements | 317/33 |
| 3,867,641 | 2/1975 | Collin | 323/902 X |
| 3,879,652 | 4/1975 | Billings | 361/100 |
| 3,924,159 | 12/1975 | Hoover | 317/33 |
| 3,944,888 | 3/1976 | Clark | 361/100 X |
| 3,958,175 | 5/1976 | Braun | 323/902 X |
| 4,054,830 | 10/1977 | Harrel | 323/277 X |
| 4,061,961 | 12/1977 | Baker | 323/902 X |
| 4,135,223 | 1/1979 | Holmes | 361/56 |
| 4,204,148 | 5/1980 | Gaertner | 323/22 |
| 4,233,546 | 11/1980 | Berthiaume | 323/223 X |
| 4,336,563 | 6/1982 | Suzuki | 361/93 |
| 4,363,064 | 12/1982 | Billings et al. | 361/100 X |
| 4,603,289 | 7/1986 | McLellan | 323/277 |

Primary Examiner—A. D. Pellinen
Assistant Examiner—Jeffrey A. Gaffin
Attorney, Agent, or Firm—Woodrow W. Ban

[57] ABSTRACT

An overcurrent protection circuit wherein excessive current flow to current handling components activates an optical coupler device which activates a crow-bar device to clamp off current flow through the current handling components. The overcurrent protection circuit finds utility in protecting solid state circuits from overcurrent situations, and is characterized by rapid response time on an order of less than one microsecond.

6 Claims, 1 Drawing Figure

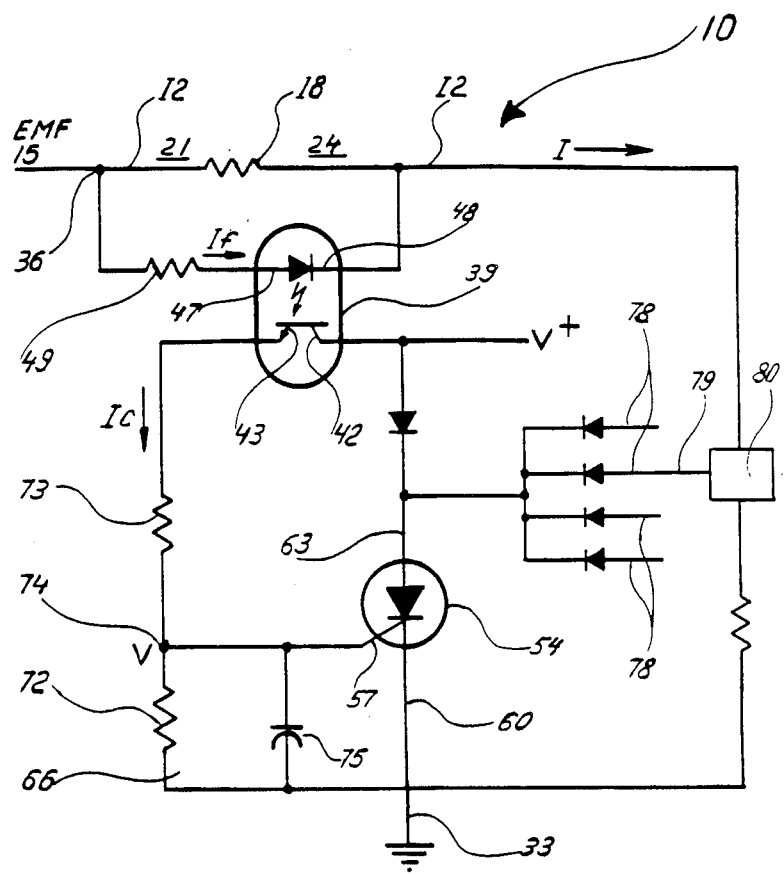
FIG. I

NOISE TOLERANT FAST ACTING OPTICAL OVERCURRENT PROTECTOR AND METHOD

FIELD OF THE INVENTION

This invention relates to electronic circuitry and more particularly to means for protecting such circuitry against damage due to overcurrent. Specifically, this invention deals with solid state overcurrent protector means and methods for detecting and averting an overcurrent situation generally within one microsecond or less.

BACKGROUND OF THE INVENTION

Protection of electrical components against overcurrent conditions is well known. Typical traditional approaches include the use of fuses or circuit breakers that detect an excessive flow of electrical current and either self destruct or mechanically open to disconnect the source of electrical current from consuming or conducting devices potentially detrimentally affectable by the overcurrent.

Such traditional fuses and breakers are typically insufficiently rapid in reaction and often times are possessed of an excessively large "blow" or "tripping" current capacity to provide protection from potentially damaging current flows lower than can be protected against, when considered as candidates for providing protection to sophisticated electronic circuits having overcurrent susceptible solid state components. More recently, response times in the microseconds, and preferably in less than a microsecond, are desirable in protecting particularly sensitive solid state circuitry devices. Traditional mechanical or quasi mechanical systems simply cannot respond with the desired rapidity.

Additionally, modern solid state circuits often require relatively low electrical currents for operation and in any event do not tolerate significant current excesses even briefly without damage. Traditional mechanical circuit breakers and fuses frequently are possessed of a value for the current required to trip such traditional devices substantially in excess of the current that can be tolerated reasonably by the solid state circuitry being protected. Accordingly, an overcurrent protection means and method for triggering overprotection in an electronic solid state circuit within a time desirably short and/or at a desirably low trip current could find substantial commercial application.

Many present day electrical current configurations can be susceptible to electrical noise and particularly to so-called common mode noise, that is, electrical noise generally equally present throughout a circuit. It is desirable that overcurrent protection be substantially tolerant of common mode noise to forestall spurious circuit shutdowns due to misdetection of common mode noise as an overcurrent situation. A current interrupter substantially tolerant of common mode noise could find substantial utility in the design of electrical circuitry.

Particularly, a common mode noise tolerant current overprotection system useful for examining electrical current flowing through a circuit at a point before the current encounters the current sensitive electronic components being protected, that is a sourcing system for control, and also for a sinking system for control wherein the examination of current occurs after the current flows through the load or on the ground side of load, could find substantial utility.

Various other sourcing system means have been suggested in the art for detecting and responding to an overcurrent or overvoltage in solid state circuitry. Examples of such proposals appear to be found in U.S. Pat. Nos. 3,303,388; 3,603,843; 4,336,563; 4,204,148; 4,135,223; and 3,924,159. But these proposals appear to be susceptible to variations in control or system overcurrent protection as a result of drift associated with the operating components as a function of temperature, total current and the like. None appear to show or suggest an optical, current flow protector inherently uniform irrespective of temperature or current flow through the solid state circuitry.

SUMMARY OF THE INVENTION

The present invention provides a method and apparatus for providing common mode electrical noise tolerant overcurrent protection generally within less than a microsecond for a solid state circuit that includes a current conductor associated with a corresponding EMF, or source of voltage, configured to flow current to a load. A sensing means and a crow-bar means are provided in the apparatus, with the sensing means being configured for triggering the crow-bar means.

The sensing means includes an optical coupler (OC) having anode, cathode, collector and emitter electrodes. The sensing means also includes a primary resistor positioned in the current conductor of a size and configuration to produce a predetermined voltage drop across the primary resistor when current flowing therethrough exceeds a desired value. The anode and cathode electrodes of the optical couplers are configured to bridge the primary resistor to subject the optical coupler to changes in the voltage across the primary resistors. The sensing means includes a joinder whereby the collector electrode of the optical coupler is joined to a voltage in the circuit being protected.

The crow-bar device includes sensing and current handling electrodes with the sensing electrode of the crow-bar device being joined to the emitter electrode of the optical coupler. In preferred embodiments, a voltage dividing means effects this joinder; voltage divider means is also joined to a point of low reference voltage in the solid state circuit.

One of the current conducting electrodes of the crow-bar device is joined to control electrodes associated with current consuming or controlling devices contained in the solid state circuit while the other current conducting electrode of the crow-bar current device is connected to a voltage in the solid state circuit, most typically the low reference voltage.

In operation, current flowing through the current conductor and thereby through the primary resistor imposes a primary voltage drop across the primary resistor proportional to the electrical current flowing through the current conductor. The anode and cathode electrodes of the optical coupler are configured to bridge the primary resistor. During overcurrent, the voltage drop associated with the primary resistor rises to a point sufficiently elevated to cause a sufficient electrical current flow through the optical coupler anode and cathode electrodes to activate the optical coupler. An optical signal within the optical coupler thereupon causes current available at the collector electrode of the optical coupler to be applied to the emitter electrode thereby completing activation of the optical coupler.

Where the voltage drop across the primary resistor is greater than the drop required to activate the optical coupler, the optical coupler establishes a conductive pathway via the emitter electrode of the OC through the voltage dividing circuit to establish a voltage at the sensing electrode of the crow-bar device. Upon application of a voltage to the sensing electrode of the crow-bar device, the crow-bar device becomes conductive and can be configured either to apply an electrical signal to control electrodes of electrical current sensitive devices through which such current flows or to remove an electrical signal from control electrodes of current sensitive components of the solid state circuit through which the current flows within either event the objective being effectively to clamp off current flow through such components or devices.

Preferably the crow-bar device is a silicon control rectifier (SCR) having anode, cathode and gate electrodes with either the anode or cathode being connected to the control electrodes of current sensitive components and the gate electrode of the SCR being joined to the emitter of the OC through the voltage dividing circuit. In preferred embodiments, the anode of the SCR is connected to the control electrode of the current consuming components and the cathode of the SCR is connected to a low voltage reference such as electrical ground.

The above and other features and advantages of the invention will become more apparent when considered in light of a description of a preferred embodiment of the invention together with a drawing, both together forming a part of the specification.

DESCRIPTION OF THE DRAWING

FIG. 1 is an electrical schematic of an embodiment of the invention.

BEST EMBODIMENT OF THE INVENTION

Referring to the drawings, FIG. 1 is an electrical schematic depicting a common mode noise tolerant overcurrent protection circuit 10 in accordance with the invention and configured to be in a sourcing system mode. By sourcing system, what is meant is a determination between a point prior to the circuit load and a low voltage reference as distinguished from sinking system which includes determinations between a point subsequent to the load and a low voltage reference.

The overcurrent protection circuit 10 includes a main current conductor 12 configured for conducting electrical current from an EMF 15, that is a source of elecromotive force, to components of a solid state circuit configured for functions such as switching the current or consuming the electrical current (not shown).

While the EMF 15 can be be of any suitable or conventional nature such as a battery, transformer, converter, or generator, often the EMF 15 is a power supply circuit associated with an electronic device utilizing the overcurrent protector.

A primary resistor 18 is positioned in the main current conductor 12 and defines a zone of more elevated voltage 21 and a zone of less elevated voltage 24 associated with a voltage drop across the primary resistor 18 resulting from flow of electrical current through the primary resistor 18. Electrical current flow is from the zone of elevated voltage 21 towards the zone of less elevated voltage 24.

The voltage drop engendered across the primary resistor 18 by passage of electrical current is a primary voltage drop and this primary voltage drop is proportional to the flow of electrical current through the main current conductor 12. As electrical current flowing through the main current conductor 12 increases, the primary voltage drop associated with the primary resistor 18 increases.

The overprotection circuit 10 includes an optical coupler (OC) 39 having collector 42, emitter 43, anode 47 and cathode 48 electrodes. The anode electrode 47 is joined to the main current conductor 12 through a resistor 49 to the zone 21 of relatively elevated voltage. The OC 39 cathode electrode 48 is joined to the zone of less elevated voltage 24 at the main current conductor 12.

The anode and cathode electrodes 47, 48 of the OC 39 are thereby configured for permitting a sensing by the OC 39 of the voltage in the zone of less elevated voltage 24 relative to the zone 21. Where this voltage differential sensed by the anode and cathode electrodes 47, 48 of the OC 39 is generally greater than a voltage drop necessary to activate light emittance by the optical coupler 39, the OC 39 will establish a conductive pathway through the emitter electrode 43. The collector electrode 42 is joined to a source of voltage and thereby provides voltage for use in establishing a voltage at the emitter electrode 43 of the OC 39.

The resistor 49 can be sized or configured to control the current flowing through the OC 39 during operation thereof and can function to modify the effect of the voltage differential between the zones 21, 24 in activating the OC 39 to an extent necessary to establish a voltage at the emitter electrode 43 sufficient to fire a crow-bar device 54.

The crow-bar device 54 is provided in the overcurrent protection circuit 10. The crow-bar device 54 includes a sensing electrode 57 and current conducting electrodes 60, 63.

A voltage dividing circuit 66, here in part a resistance-capacitor (R-C) circuit is provided joining the sensing electrode 57, of the crow-bar device 54 with the emitter electrode 43 of the OC 39. The voltage dividing circuit 66 is tied to the point of low voltage 33, that is the low reference voltage. The voltage dividing circuit includes resistor 72, 73 and a capacitor 75. The value of the resistor 72 is configured to permit a sufficient current drain from a junction 74 to require a significant current to flow through the emitter electrode 43 to trigger the crow-bar device. Spurious current surges thereby avoid triggering the crow-bar device 54. The capacitor 75 functions to further buffer against spurious currents triggering the crow-bar device 54.

The crow-bar device 54 can be of any suitable or conventional type configured for altering the state of current flow through the crow-bar device 54 via the conducting electrodes 60, 63 upon the presence of a particular voltage or current at the sensing electrode 57. Typically, the crow-bar device is a silicon control rectifier (SCR), but may, depending upon circuit conditions include triodes, pentodes, field effect transistors (FET), tetrodes, silicon controlled switches, gate controlled switches, thyratrons, unijunction transistors, or the like that may be determined to be of utility in the particular circuit configuration for which the overcurrent protection device 10 is being configured.

The crow-bar device 54 is configured to be joined through the current carrying electrode 60 to control electrodes 79 of current switching 80 devices, such as FET transistors and the like, which it is desired be protected from overcurrent. In the configuration of FIG. 1, when the SCR is activated, the electrodes 60, 63 function to drain such control electrodes 79 to the point of low voltage 33. Drainage of the control electrodes functions to switch off or "clamp off" devices 80 controlled by such control electrodes.

It should be apparent that the role of the current carrying electrodes 60, 63 can be reversed whereby activation of the crow-bar device 54 applies a current to a control electrode for such purposes as to obtain a current clamping action on a device controlled by the control electrode. The particular selection of a voltage orientation for the current carrying electrode 60, 63 is a function of the nature of the devices being protected.

The crow-bar device 54 is reset in suitable or conventional manner by, typically, creating a condition of low current flow through the current carrying electrode 60, 63. The crow-bar device 54 is turned off in FIG. 1 by eliminating V+. V+ is required to assure that the crow-bar device 54 remains on during a time period sufficient to effect a current stopping function. Where the crow-bar device is an SCR, low current flow functions to turn off the crow-bar device 54. It should be apparent that the crow-bar device 54 could also be configured to supply electrical current to control electrodes (not shown) of devices controlled by such control electrodes during normal operation, and by the application of electrical current from the emitter 43 of the OC 39 to the sensing electrode 57 of the crow-bar device 54, current flow could be terminated through the conducting electrodes 60, 63 to these controlled electrodes. Operation of devices controlled by such control electrodes could be thereby terminated. Conduits 78 are provided for communicating electrical current and voltage between the current carrying electrode 60 of the crow-bar device 54 and control electrodes 79 of any electrical device 80 it is desired be protected employing the device 10 of the invention.

In operation of the overcurrent protecting device 10, an excessive current flow through the main current conductor 12 causes a voltage drop across the primary resistor 18 producing a voltage at the zone of less elevated voltage 24 sufficiently lower than the voltage present at a junction 36 so that current flows through the resistor 49 and anode 47 and cathode 48 electrodes of the OC 39 sufficient to activate the OC 39 to introduce into the voltage divider 66 a current sufficient to activate the crow-bar device 54 triggering the sensing electrode 57 of the crow-bar device 54. The crow-bar device 54 closes to strip via the conductors 78 current-/voltage present at control electrodes of devices for which overcurrent protection is desired and which are controlled by such control electrodes by passing the electrical current through the conducting electrodes 60, 63 to the point of low voltage 33. If the crow-bar device 54 is of a latching type, the crow-bar device 54 remains in the conducting mode until reset for example by elimination of V+; otherwise the crow-bar device 54 can revert to an open or non-conducting mode.

The circuit of the instant invention typically functions within less than one microsecond to effect a clamping off of the flow of electrical current through components of the solid state circuit configured for switching and/or consuming electrical current flowing through the circuit. This rapid response time can be of great value in protecting such devices as bipolar or FET transistors. By virtue of the optical interconnection established by the OC 39, the circuit is substantially resistant to erroneous tripping associated with common-mode electrical noise.

EXAMPLE 1

A circuit was constructed in accordance with FIG. 1 wherein resistor 18 was 0.1 Ω, the resister 49 was 20 Ω, and the resister 72 and 73 were 100 Ω. The optical coupler was a 4N38 and the crow-bar device 54 was a 2N5062 SCR.

For a variety of currents flowing through the main conductor 12 under the designation I, subsidiary currents, $I_c$, $I_f$, were calculated for the circuit and a voltage V was determined for the node or junction 74. These values are set forth in Table I. Based upon the triggering characteristics for the SCR, the triggering status was ascertained and is listed in Table I. It may be seen that no triggering can occur until at least 12 amps of current is flowing. Triggering absolutely occurs by the achievement of 26 amperes in the main conductor 12. In between the status of triggering will depend upon the status of the SCR; if hot, triggering will occur at a lower current flow, while if cold, triggering will occur at a higher current flow. It should be noted, with respect to the optical coupler 39, that small amounts of current begin to flow at the emitter in low levels with even 5 amperes of current flowing through the main conductor 12. The voltage dividing circuit 66 functions to avoid these minor currents triggering the crow-bar device 54.

TABLE I

| I | $I_f$ | $I_c$ | V | SCR Trigger |
| --- | --- | --- | --- | --- |
| 0 | 0 | 0 | 0 | No |
| 5 A | Off chart <.1 ma | Off chart <.05 ma | <5 mv | No |
| 10 A | Off chart <1 ma | .1 to .4 ma | 10 mv to 40 mv | No |
| 12 A | 5 ma | .8 to 2.4 ma | 80 mv to 240 mv | probably not |
| 14 A | 10 ma | .2 ma to 5 ma | 200 mv to 500 mv | maybe |
| 16 A | 20 ma | 4 ma to 10 ma | 400 mv to 1 V | probably |
| 18 A | 30 ma | 6 ma to 15 ma | 600 mv to 1.5 V | probably |
| 20 A | 38 ma | 8 ma to 18 ma | 800 mv to 1.8 V | probably |
| 22 A | 48 ma | 9 ma to 20 ma | 900 mv 2.0 V | probably |
| 24 A | 55 ma | 10 ma to 22 ma | 1 V to 2.2 V | probably |
| 26 A | 62 ma | 12 ma to 25 ma | 12 v to 2.5 v | yes |

While a preferred embodiment of the invention has been shown and described in detail, it should be apparent that various modifications may be made thereto without departing from the scope of the claims that follows.

What is claimed is:

1. In a solid state circuit including a current conduit having a corresponding supply voltage and at least one current consuming switching device including a control electrode means and configured to conduct electrical current to a load, an overcurrent protector configured for action therein in less than one microsecond comprising: a sensing means and crowbar means, the sensing means being configured for triggering the crowbar means; the sensing means including an optical coupler having anode, cathode, collector and emitter electrodes, a primary resistor positioned in the current conductor of a size configured to produce a predetermined sensing means triggering voltage drop across the primary resistor when current flowing therethrough exceeds a desired value; a means whereby the anode and cathode of the optical coupler are subjected to a voltage drop across the primary resistor; the crowbar device having anode, cathode and gate eletrodes, the crowbar device gate electrode and the optical coupler emitter electrode being joined through a voltage divider circuit with the voltage divider circuit being joined to a point of low reference voltage in the solid state circuit; one of the crowbar device anode and cathode electrodes being joined to the control electrode means for the current consuming/switching devices contained in the solid state circuit and the other crowbar device electrode being connected to a voltage in the solid state circuit.

2. The protector of claim 1, the crow-bar device being a silicon controlled rectifier (SCR), the SCR cathode electrode being connected to the point of low voltage reference.

3. The protector of claim 2, the point of low voltage reference being ground.

4. In a solid state circuit, the circuit including a current conduit supplying electrical current at a particular voltage to at least one current consuming/switching component, each having a control electrode, a method for providing overcurrent protection in less than a microsecond for the current consuming/switching component comprising the steps of:

impressing a primary voltage drop in the current conduit proportional to the electrical current flowing in the current conduit;

sensing the impressed voltage drop in the current conduit employing anode and cathode electrodes of an optical coupler;

connecting through a voltage dividing circuit, a emitter electrode of the optical coupler to a sensing electrode of a crowbar device;

connecting one current conducting electrode of the crowbar device to a reference voltage in the circuit;

connecting a remaining current conducting electrode of the crowbar device to a control electrode of the current consuming/switching component whereby detection at the optical coupler anode and cathode of a sensed voltage drop greater than a desired voltage drop activates the optical coupler and thereby activateing the crowbar device, thereby effecting a clamping off of electrical current flow at the current consuming component.

5. The method of claim 4, the crow-bar device being a silicon control rectiifier (SCR) having anode, cathode and gate electrodes, the anode electrode being joined to the control electrode of the current consuming/switching component, the gate electrode of the SCR being joined to the emitter electrode of the optical coupler through the voltage divider circuit.

6. The method of claim 5, the reference voltage being ground.

* * * * *